United States Patent Office 3,280,100
Patented Oct. 18, 1966

3,280,100
BASIC MONOAZO DYESTUFFS
Jacques Voltz, 15 Pilgerstrasse, Basel, Switzerland
No Drawing. Filed Apr. 5, 1962, Ser. No. 185,240
Claims priority, application Switzerland, Apr. 6, 1961,
4,077/61
8 Claims. (Cl. 260—146)

The present invention concerns new basic azo dyestuffs, processes for the production thereof, process for the dyeing of polymeric and copolymeric acrylonitrile fibres and, as industrial product, the polymeric and copolymeric fibre dyed with these dyestuffs.

It has been found that valuable azo dyesuffs are obtained which dye polymeric and copolymeric acrylonitrile fibres in pure, fast shades, if a monoazo dyestuff or the general Formula I

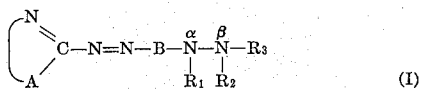

is reacted with a reactive ester of the general Formula II $$R_4-X \quad (II)$$

to for a cyclammonium compound of the general formula

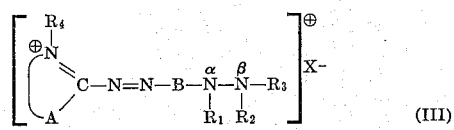

In the Formulae I and III:

A represents a divalent radical which completes a possibly substituted and/or condensed heterocyclic compound of aromatic characater which, however, is at most dinuclear, B represents a possibly substituted phenylene radical bound in the 1,4-position to the azo or hydrazine group, $R_1$ and $R_2$ are each hydrogen or a low aliphatic radical, $R_3$ represents hydrogen or an organic radical, and $R_2$ and $R_3$ together also represent an aliphatic, cycloaliphatic or aralipatic ylidene radical or, with the inclusion of the nitrogen atom of the hydrazino group in the $\beta$-position, also a heterocyclic ring, and also $R_1$, $R_2$ and $R_3$ together with the two nitrogen atoms of the hydrazino group represent a heterocyclic ring;

in Formulae II and III $R_4$ represents an alkyl or aralkyl radical possibly containing inert substituents, and X represents the anion of an acid.

"A" chiefly completes a 5 to 6 membered, possibly benzo-condensed hereto ring of aromatic character, i.e. an azole or azine or benzazole or benzazine ring, such as, e.g. a pyrazole, imidazole, triazole, tetrazole, oxazole, thiazole, selenazole, oxdiazole, thiodiazole, pyridine, pyrimidine, triazine or an indazole, benzimidazole, benzoxazole, benzthiazole or benzselenazole ring. These rings can contain substitutents, e.g. aliphatic groups such as the methyl, ethyl, hydroxyethyl, propyl, isopropyl or n-butyl group; cycloaliphatic groups such as, e.g. the cyclohexyl group; aralphatic groups such as, e.g. the benzyl group; aromatic groups such as, e.g. the phenyl or a toluyl group; then alkoxy, cycloalkoxy, aralkoxy or aryloxy groups; also possibly esterified carboxyl groups, e.g. the carbomethoxy or carboethoxy group; the cyano group; acyl groups, e.g. the acetyl or benzoyl group; sulphonyl groups such as the methylsulphonyl or ethylsulphonyl group; the nitro group; or halogens such as, e.g. chlorine or bromine. Preferably, "A" completes a possibly benzocondensed azole ring.

"B" can be substituted, for example by low aliphatic groups particularly the methyl or ethyl group, by low alkoxy groups, e.g. the methoxy or ethoxy group, or by halogens, e.g. chlorine or bromine.

Each of $R_1$ and $R_2$ represents, for example, a low alkyl radical such as the methyl or ethyl radical. Preferably $R_1$ is a low alkyl group, in particular the methyl or ethyl group, and $R_2$ is hydrogen.

$R_3$ is, for example, an aliphatic radical, e.g. the methyl or ethyl radical; a cycloaliphatic radical, e.g. the cyclohexyl radical; an araliphatic radical such as the benzyl radical; or an aromatic radical, e.g. the phenyl radical; or an acyl radical, e.g. an acyl radical derived from an aliphatic, araliphatic or carbocyclic carboxylic acid or carbonic acid, i.e. for example an acetyl, propionyl, phenylacetyl, benzoyl or carbalkoxy radical.

Monoazo dyestuffs usable according to the invention of the Formula I in which $R_3$ is an acyl radical, correspond to the general Formula IV

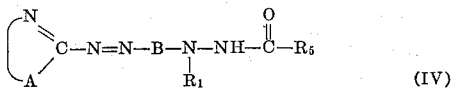

wherein the symbols A, B and $R_1$ have the meanings given in Formula III and $R_5$ represents an aliphatic, araliphatic or carbocyclic radical possibly bound to the carbonyl carbon atom by an —O— bridge.

Monoazo dyestuffs of Formula I in which $R_2$ and $R_3$ together represent an aliphatic, cycloaliphatic or araliphatic ylidene radical correspond to the general Formula V

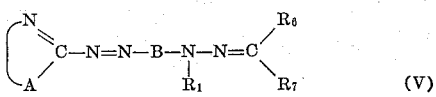

wherein A, B and $R_1$ have the meanings given in Formula III and $R_6$ represents hydrogen or an organic radical and $R_7$ represents an organic radical, it being possible for $R_6$ and $R_7$ together with the C atom to form a ring.

Examples of organic radicals for $R_6$ and $R_7$ are: aliphatic radicals, e.g. low alkyl radicals such as the methyl or ethyl group; cycloaliphatic radicals such as the cyclohexyl group; araliphatic radicals such as the benzyl group; or aromatic radicals such as the phenyl group. If $R_6$ and $R_7$ together with the C atom form a ring, this is in particular the cyclohexane ring.

If $R_2$ and $R_3$ with the inclusion of the $\beta$-positioned nitrogen atom of the hydrazino group represent a heterocyclic ring, then they form for example a five membered ring, such as the pyrrolidine ring or a 6 membered ring, e.g. the piperidine or morpholine ring.

Compounds usable according to the invention of Forula I in which $R_1$, $R_2$ and $R_3$ together with the two nitrogen atoms of the hydrazino group form a heterocyclic ring, correspond to the general Formula VI

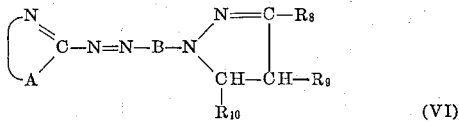

In this formula A and B have the meanings given in Formula III and each of $R_8$, $R_9$ and $R_{10}$ independently represent hydrogen or an aliphatic or aromatic radical.

Examples of aliphatic radicals are low alkyl groups such as, e.g. the methyl or ethyl group, and of aromatic radicals are principally those of the benzene series, in particular the phenyl radical.

In Formulae II and III, $R_4$ represents, for example, a low alkyl radical, e.g. the methyl, ethyl, n-propyl, isopropyl or n-butyl radical, or an aralkyl radical, e.g. the benzyl radical.

X represents the anion of an inorganic acid, for example of a halogen hydracid or of sulphuric acid possibly esterified once with low alkanols, or of an organic acid, e.g. an arylsulphonic acid such as benzene or p-toluene sulphonic acid or of oxalic acid.

The monoazo dyestuffs of Formula I which are used as starting materials according to the invention are obtained, for example, by coupling the diazonium compound of an amine of the general Formula IX

(IX)

with a coupling component of the general Formula VIII

(VIII)

In Formulae IX and VIII, A, $R_1$, $R_2$ and $R_3$ have the meanings given in Formula III, and B is a phenyl radical in p-position to the α-nitrogen atom which can be coupled.

Examples of compounds of Formula IX are: 2-aminopyrazole, 2-aminothiazole, 2-amino-4-methylthiazole, -4-ethylthiazole, -4-propylthiazole, -4-butylthiazole, -4-phenylthiazole, -4,5-dimethylthiazole, -4,5-diphenylthiazole, -4-methyl-5-hydroxyethylthiazole, -4-methoxythiazole, -4-ethoxythiazole or -4-acetylthiazole, 5-amino-1,2,4-triazole, 3-methyl-5-amino-1,2,4-triazole, 5-amino-1,2,4-triazole-3-carboxylic acid, 2-amino-1,3,4-thiodiazole, 2-amino-5-methyl-1,3,4-thiodiazole, 2-aminobenzthiazole, 2-amino-6-methylbenzthiazole, -6-ethylbenzthiazole, -6-methoxybenzthiazole, -6-ethoxybenzthiazole, -6-chlorobenzthiazole, -6-bromobenzthiazole, -6-nitrobenzthiazole, -6-methylsulphonylbenzthiazole or -6-ethylsulphonpylbenzthiazole, or 3-aminoindazole.

Examples of coupling components of Formula VIII are:

N-phenyl-N,N'-dimethyl-hydrazine,
N,N'-diphenyl-N-methyl-hydrazine,
N-phenyl-N-ethyl-N'-methyl-hydrazine,
N-phenyl-N,N',N'-trimethylhydrazine,
N-phenyl-N-methyl-N'-acetyl-hydrazine,
N-phenyl-N-methyl-N'-propionyl-hydrazine,
N-phenyl-N-methyl-N'-n-butyryl-hydrazine or
N-phenyl-N-methyl-N'-benzoyl-hydrazine,
N-(3'-methylphenyl)-,
N-(3'-ethylphenyl)-,
N-(3',5'-dimethylphenyl)- or
N-(3',5'-diethylphenyl)-N-methyl-N'-acetyl-hydrazine or the hydrazone from N-phenyl-N-methyl-hydrazine and acetone, methylethylketone, acetophenone, benzophenone or cyclohexanone or benzaldehyde, as well as 1,3-diphenyl-pyrazoline, 1,3,5-triphenyl-pyrazoline or 1-phenyl-3-methyl-pyrazoline.

Reactive esters of Formula II usable according to the invention are, e.g. the methyl, ethyl, propyl, butyl or benzyl esters of hydrogen chloride, hydrogen bromide, hydrogen iodide, the methyl or ethyl esters of sulphuric acid, benzene sulphonic acid or p-toluene sulphonic acid.

The reaction of the monoazo dyestuff of Formula I with the reactive esters of Formula II to form a cyclammonium compound of Formula III is performed advantageuosly by heating the two starting materials in an inert organic solvent. Examples of inert organic solvents are possibly halogenated or nitrated aromatic hydrocarbons such as, e.g. halogen or nitro- benzenes or possibly halogenated aliphatic hydrocarbons such as, e.g. trichloroethylene or tetrachloroethane.

The cyclammonium compounds of Formula III are formed as salts of acids of the esters corresponding to Formula II which are used in their production, i.e. as colour salts of inorganic or organic acids. They are thus, mainly, chlorides, bromides, iodides, methosulphates, ethosulphates, bisulphates, benzene sulphonates or p-toluene sulphonates. If desired, also salts of other acids can be produced by double reaction, e.g. oxalates by the addition of oxalic acid. Also double salts can be produced, for example, with the dyestuff halides and corresponding zinc or cadmium salts.

A modification of the process according to the invention for the production of azo dyestuffs consists in reacting a hydrazone of the general Formula VII

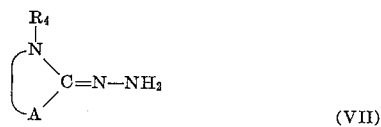

(VII)

in aqueous acid medium and in the presence of an oxidising agent, with a compound of the general Formula VIII

(VIII)

to form a compound of the general Formula III

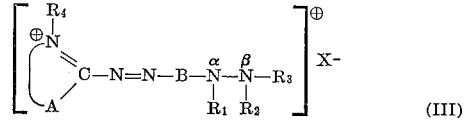

(III)

Examples of hydrazones of Formula VII are those which are derived from the following oxo compounds:

3,4-dimethyl-thiazolinone-(2),
1-methyl-1,2-dihydro-pyridone-(2),
3-methyl- or
3-ethyl-benzthiazolinone-(2),
3-methyl-6-methoxy or
3-methyl-6-ethoxy-benzthiazolinone-(2)
1,3,3-trimethylindoleninone-(2),
6-methoxy-1,3,3-trimethyl-indoleninone-(2) or
1,4-dimethyl-1,2-dihydroquinolone-(2).

Examples of coupling components corresponding to Formula VIII are the same as those for the coupling with diazonium compounds.

The reaction of the hydrazone of the Formula VII with the compound of Formula VIII is performed advantageously in such a way that the oxidising agent is added at a temperature of about 30–80° C. to an acid aqueous solution of these two reaction partners. Suitable oxidising agents are, e.g. hydrogen peroxide, hypochlorites, persulphates, perborates as well as certain iron-(III), copper-(II) or mecury-(II) compounds; a particularly desirable oxidising agent is potassium ferricyanide.

The medium is made acid, depending on the reaction components used, with weak acids such as, e.g. low fatty acids, for example acetic acid, or with strong acids such as, e.g. halogen hydracids or sulphuric acid. Thus, the dyestuffs of Formula III obtained according to the invention are obtained as colour salts of these weak or strong acids, i.e., for example, as acetates, chlorides, bromides or sulphates; if desired, these colour salts can be converted into other salts by double reaction.

The compounds of Formula III obtained according to the invention are generally well soluble in water, this particularly when in the form of salts of a strong inorganic acid or organic sulphonic acid.

On heating in an open bath or in a closed bath under pressure, they have from considerable to complete drawing power from an aqueous neutral or—preferably—from a weakly acid solution, possibly in the presence of dispersing wetting agents (such as, e.g. in the presence of condensation products of alkylene oxides and higher alkanols) onto polymeric or copolymeric acrylonitrile fibres and produce pure and fast, in particularly light fast, dyeings. The high degree of light fastness is all the more surprising as experience has shown that azo dyestuffs having a hydrazino group in the molecule have only slight fastness to light.

A preferred group of dyestuffs according to this invention correspond to the formula

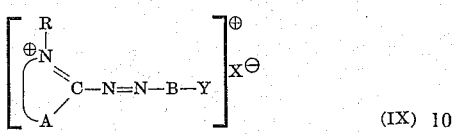

(IX)

wherein

A represents the divalent radical necessary to complete a heterocyclic nucleus, said heterocyclic nucleus in particular being a thiazole, a benzthiazole, a triazole, an indazole, a thiodiazole or a pyridine nucleus, R is a lower alkyl or the benzyl group, —CH$_3$ or —C$_2$H$_5$ being preferred, B is the phenylene or a lower alkyl substituted phenylene linked in a para position to said azo group and said Y group respectively, Y represents the

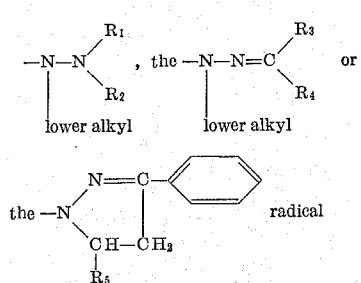

wherein

R$_1$ is hydrogen or the —CH$_3$ group

R$_2$ is hydrogen, or the —CH$_3$ or the acyl group e.g. —COCH$_3$, —COOC$_2$H$_5$, —COCH$_2$CH$_3$ or —COC$_6$H$_5$, R$_3$ is the —CH$_3$ or the C$_6$H$_5$ group, R$_4$ is the —CH$_3$ or the —C$_6$H$_5$ group, and R$_3$ and R$_4$ when taken together with the adjacent carbon atom is cyclohexyl, R$_5$ is hydrogen or the —C$_6$H$_5$ group, and X means an anion, e.g. Cl$^-$ or ZnCl$_3^-$.

By "lower alkyl" in the above is meant an alkyl having one to four carbon atoms, —CH$_3$ or —C$_2$H$_5$ being preferred.

In above Formula IX A is for example the radical for an unsubstituted or substituted (2)-benzthiazole nucleus, preferred substituents being lower alkyl groups (1–4 carbon), in particular —CH$_3$, lower alkoxy groups (1–4 carbon), in particular —OCH$_3$ or —OC$_2$H$_5$, halogen, in particular chlorine, nitro and —SO$_2$CH$_3$ groups, the radical of an unsubstituted or substituted (2)-thiazole nucleus, preferred substituent being a lower alkyl (1–4 carbon) groups, in particular —CH$_3$, —CH$_2$CH$_2$OH or —C$_4$H$_9$, lower alkoxy (1–4 carbon) groups, in particular —OCH$_3$, aryl groups, in particular —C$_6$H$_5$ and lower acyl groups, in particular —COCH$_3$, the radical of an unsubstituted or substituted (5)-triazole nucleus, preferred substituents being —CH$_3$ or —COOH groups, or the 5-methyl-(2)-thiodiazole radical, the (3)-indazole radical, or the (2)-pyridine-1-methyl radical.

B is, for example, the p-phenylene radical, or a lower alkyl mono or di-substituted p-phenylene, preferred substituents being the methyl or the ethyl group.

If in Formula IX Y is the

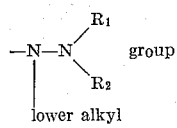

then it is advantageously the

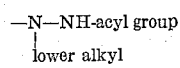

wherein acyl in particular is the —COCH$_3$, the

—COOC$_2$H$_5$ the —COCH$_2$CH$_3$ or the —COC$_6$H$_5$ group, the

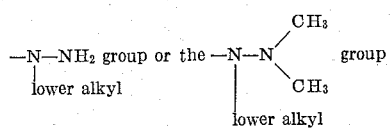

The anion X$^-$ in the dyestuff according to the invention is generally uncoloured but it is of no particular significance for the dyeing properties. It functions merely as a salt forming component.

The following examples illustrate the invention. Where not otherwise mentioned, parts are given therein as parts by weight. The temperatures are in degrees centigrade. The relationship of parts by weight to parts by volume is as that of kilogrammes to litres.

*Example 1*

13.7 parts of nitrosyl sulphuric acid are added at —5 to 0° within 1 hour while stirring well to a solution of 10 parts of 2-aminothiazole in 100 parts by volume of dilute sulphuric acid of 60° Bé. The resultant solution of the diazonium salt is left to stand for a further hour at 0° and then it is added dropwise to a solution of 16.4 parts of N-phenyl-N-methyl-N'-acetyl-hydrazine and 10 parts of sodium acetate in 250 parts of water acidified with sulphuric acid, which solution has been previously cooled to 0–5°. The pH of the reaction mixture is kept at 3 to 4 by the simultaneous addition dropwise of caustic soda lye. On completion of the coupling, the suspension of the azo dyestuff is neutralised and the red-orange product is filtered off, washed with water and dried. From an aqueous dispersion, it dyes polyester fibres such as acetyl cellulose or polyglycol terephthalate in vivid red-orange shades which have good fastness properties.

5.5 parts of this dyestuff are dissolved in 300 parts by volume of hot chlorobenzene. 2.6 parts of dimethyl sulphate are added to this solution at 100° and then the whole is heated for 30 minutes at 100–110°. The violet colour salt which precipitates on cooling the reaction mass is filtered off and dissolved in 500 parts of warm water. The solution is clarified with a little charcoal and the dyestuff is precipitated as the zinc chloride double salt with the aid of zinc chloride and sodium chloride. It dissolves in water with a violet colour and dyes polyacrylonitrile fibres from an acetic acid bath in violet shades which have excellent fastness to light. The dyebath is considerably exhausted.

A similar but somewhat more reddish dyestuff is obtained if 17.8 parts of N-(3'-methylphenyl)-N-methyl-N'-acetyl-hydrazine is used as coupling component. Aqueous colour salts having similar properties is obtained if, in the above example, 13 parts of 2-amino-4-methoxythiazole, 14.2 parts of 2-amino-4-acetylthiazole, 15.6 parts of 2-amino-4-n-butylthiazole, 17.6 parts of 2-amino-4-phenylthiazole, 12.8 parts of 2-amino-4,5-dimethylthiazole, 15.8 parts of 2-amino-4-methyl-5-hydroxyethylthiazole or 25.2 parts of 2-amino-4,5-diphenylthiazole are used as diazo component or if 19.2 parts of N-phenyl-N-methyl-N'-propionylhydrazine, 22.6 parts of N-phenyl-N-methyl-N'-benzoyl-hydrazine or 17.8 parts of N-(3'-methylphenyl)-N-methyl-N'-benzoyl-hydrazine are used as coupling component.

If the solution of 5 parts of the violet colour salt described in the second paragraph of this example is boiled for 1 hour in 200 parts of volume of 2 N hydrochloric acid, then by adding zinc chloride and potassium chloride to the cooled reaction mixture, the violet colour salt of the formula

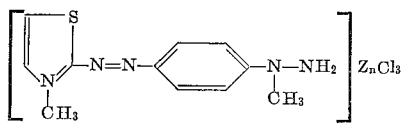

is obtained. It dyes polyacrylonitrile fibres in violet shades which have good wet and light fastness properties.

*Example 2*

8.4 parts of 5-amino-1,2,4-triazole are diazotised by known processes and the diazo compound is coupled with 16.6 parts of N-phenyl-N-methyl-N'-acetyl-hydrazine in 200 parts of water acidified with sulphuric acid. The reaction mixture is neutralised and the yellow-orange dyestuff which precipitates after stirring for 1 hour is filtered off.

The resultant dyestuff is dried and 27 parts thereof are suspended with 0.5 part of magnesium oxide in 300 parts by volume of tetrachloroethane and the suspension is heated to 120°. 5 parts of dimethyl sulphate in 20 parts of tetrachloroethane are added dropwise within 10 minutes while stirring well and the reaction mixture is kept for another 30 minutes at 120°. 300 parts of water are added to the cooled dyestuff solution which is then subjected to steam distillation to remove the organic solvent. The resultant aqueous solution is clarified with a little charcoal and the dyestuff is precipitated as zinc chloride double salt with zinc chloride and potassium chloride. The double salt dissolves in water with a red-orange colour. The dyestuff of the formula

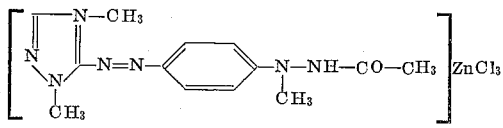

dyes polyacrylonitrile fibres from an acetic acid bath, with substantial exhaustion thereof, in vivid red-orange shades which have excellent fastness to light.

Dyestuffs having similar properties are obtained if, in the above example, the corresponding amount of 3-methyl-5-amino-1,2,4-triazole or 5-amino-1,2,4-triazole-3-carboxylic acid is used as diazo component or if N-phenyl-N-ethyl-N'-acetyl-hydrazine is used as coupling component.

If the solution of 5 parts of the red-orange colour salt obtained with the last named coupling component is boiled for 1 hour in 200 parts by volume of 2 N hydrochloric acid, then by adding zinc chloride and potassium chloride to the cooled reaction mixture, the red-orange colour salt of the formula

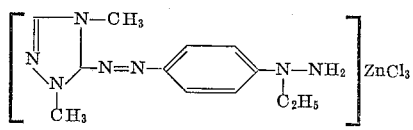

is obtained. It dyes polyacrylonitrile fibres in red-orange shades which have good fastness to wet and light.

*Example 3*

5.7 parts of 2-amino-5-methyl-1,3,4-thiodiazole in 100 parts by volume of 40° Bé sulphuric acid are quickly diazotised at −10° with a solution of 3.5 parts of sodium nitrite in 35 parts of water. 7.5 parts of N-phenyl-N,N',N'-trimethyl-hydrazine in 20 parts of acetic acid are poured into this diazo solution, the whole is stirred for 15 minutes at 0–5°, then poured into 250 parts of ice water and the reaction mixture is buffered to pH 5 to 6 with dilute caustic soda lye. The dyestuff which precipitates is filtered off, washed and dried.

From an aqueous dispersion, the red product so obtained dyes polyester fibres such as acetyl cellulose or polyglycol terephthalate, in red-orange shades which have good general fastness properties.

A solution of 2.8 parts of this dyestuff and 1.6 parts of diethyl sulphate in 300 parts of xylene is boiled for 2 hours while stirring well. After cooling the reaction mass, the reaction product is filtered off and taken up in 200 parts of hot water. The violet solution is filtered and, after addition of 1.5 parts of zinc chloride and sodium chloride, the colour salt is precipitated as zinc chloride double salt. The dyestuff of the formula

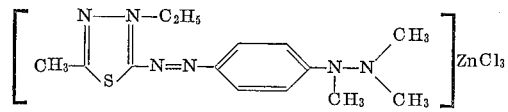

dissolves in water with a violet colour and dyes polyacrylonitrile fibres from an acetic acid bath, with almost complete exhaustion thereof, in violet shades which have excellent fastness properties.

*Example 4*

18 parts of 2-amino-6-methoxybenzthiazole in 150 parts of 85% acetic acid and 20 parts of concentrated sulphuric acid are diazotised at −5 to 0° with the solution of 6.9 parts of sodium nitrite in 35 parts of sulphuric acid. The diazo solution is poured, while stirring at 0–5°, into the suspension of 16.2 parts of N-methyl-N-phenyl hydrazone of acetone in a mixture of 75 parts of dioxan and 75 parts of water. The pH of the reaction mixture is kept at 5–6 by the simultaneous addition dropwise of caustic soda lye After the addition of 500 parts of water, the red dyestuff is filtered off, washed with water and dried.

From aqueous dispersion, it dyes polyglycol terephthalate fibres in vivid red shades which have excellent fastness to sublimation.

3.5 parts of the dry dyestuff are dissolved in 100 parts of hot chlorobenzene and the mixture of 2 parts of dimethyl sulphate in 10 parts of chlorobenzene is added dropwise within 30 minutes while refluxing with stirring. The red-violet solution becomes blue and the cyclammonium salt precipitates. The precipitate is filtered off after cooling, and, to further purify, is dissolved in 1500 parts of hot water, the solution is clarified with animal charcoal and the dyestuff is precipitated with sodium chloride. It is filtered off and dried. The colour salt of the formula

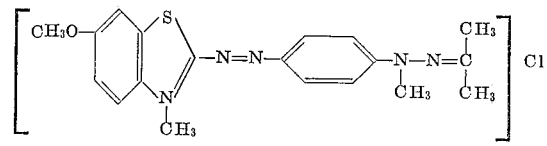

dissolves in water with a blue colour and dyes polyacrylonitrile fibres in vivid blue shades which have excellent fastness properties.

Similar dyestuffs are obtained if, in the above example, 19.4 parts of 2-amino-6-ethoxybenzthiazole, 16.1 parts of 2-amino-6-chlorobenzthiazole, 16.4 parts of 2-amino-6-methylbenzthiazole, 19.5 parts of 2-amino-6-nitrobenzthiazole, 22.8 parts of 2-amino-6-methylsulphonylbenzthiazole or 15 parts of 2-aminobenzthiazole are used as diazo component.

*Example 5*

13.3 parts of 3-aminoindazole in 100 parts of water and 50 parts of concentrated hydrochloric acid are diazotised at 0–5° with 6.9 parts of sodium nitrite. While cooling well, the diazo solution is added dropwise to a suspension of 22.4 parts of the N-phenyl-N-methyl hydrazone of acetophenone in 200 parts of a mixture of dioxan and water in a ratio of 1:1. The pH of the coupling mass is kept at 5–6 by the simultaneous addition of caustic soda lye. The orange dyestuff is completely precipitated by the addition of 500 parts of water, it is filtered off and washed with water.

A suspension of 3.7 parts of this dyestuff and 0.4 part of magnesium oxide in 200 parts of chlorobenzene is reacted for 1 hour at 120° with 3 parts of dimethyl sulphate in 10 parts of chlorobenzene. The dyestuff which precipitates out after cooling is filtered off, dissolved in 500 parts of hot water and again precipitated from the solution, which has been clarified with a little animal charcoal, with 1.5 parts of zinc chloride and sodium chloride. The colour salt of the formula

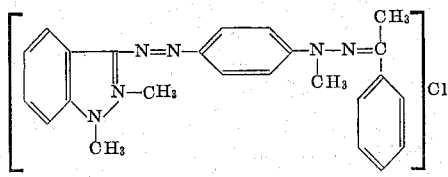

dissolves in water with a red-violet colour. Polyacrylonitrile fibres are dyed from an acetic acid bath, with almost complete exhaustion thereof, in ruby red shades which have very good fastness to light.

Similar products are obtained on using 16.2 parts of the N-phenyl-N-methyl-hydrazone of acetate or 17.6 parts of the N-phenyl-N-ethyl-hydrazone of acetone, or 28.6 parts of the N-phenyl-N-methyl-hydrazone of benzophenone instead of the 22.4 parts of the N-phenyl-N-methyl-hydrazone of acetophenone.

*Example 6*

18 parts of 2-amino-6-methoxy-benzthiazole are diazotised as described in Example 4 and coupled with a suspension of 22.2 parts of 1,3-diphenyl-pyrazoline. From an aqueous suspension, the red azo dyestuff so obtained dyes polyester fibres in red shades which have excellent fastness to sublimation.

3.9 parts of the dry dyestuffs are dissolved in 100 parts of hot chlorobenzene and 15 parts of dimethyl sulphate in 10 parts of chlorobenzene are added within 1 hour at 110–120°. A change in colour from red to blue-violet is to be observed. After cooling, the resultant dyestuff is filtered off and, to further purify, dissolved in 250 parts of hot water. The solution is clarified with a little charcoal and the dyestuff is precipitated with sodium chloride. The colour salt of the formula

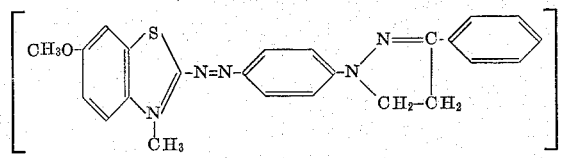

dyes polyacrylonitrile fibres from an acetic acid bath in blue-violet shades which have excellent fastness properties.

A similar dyestuff is obtained on using 29.8 parts of 1,3,5-triphenyl pyrazoline instead of the 22.2 parts of 1,3-diphenyl pyrazoline.

*Example 7*

A solution of 16 parts of chromium trioxide in 20 parts of acetic acid is added dropwise at 60–70° within 30 minutes while stirring well to a solution of 12.3 parts of 1-methyl-1,2-dihydropyridone-(2)-hydrazone and 16.4 parts of N-phenyl-N-methyl-N'-acetyl-hydrazine in 200 parts of 50% acetic acid. A red-violet colour salt is formed. The reaction mixture is heated for a furhter 30 minutes at 70°, then diluted with 100 parts of cold water and, after the addition of a little kieselguhr and charcoal, filtered. 10 parts of zinc chloride are added to the filtrate and the dyestuff is precipitated as zinc chloride double salt with the aid of sodium chloride. It is filtered off and dried. The dyestuff of the formula

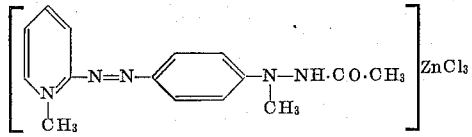

dissolves in water with a violet colour and dyes polyacrylonitrile fibres from an acetic acid bath in red-violet shades which have excellent fastness properties.

Similar, somewhat more reddish violet colour salts are obtained on using 17.8 parts of N-(3'-methylphenyl)-N-methyl-N'-acetyl-hydrazine, 19.2 parts of N - (2',5' - dimethylphenyl)-N-methyl-N'-acetyl-hydrazine or 16.6 parts of N-phenyl-N-methyl-N'-carboethoxy-hydrazine.

*Example 8*

18 parts of 2-amino-6-methoxybenzthiazole are diazotised analogously to Example 1 and coupled with 16.4 parts of N-phenyl-N-methyl-N'-acetyl-hydrazine. The red product so obtained dyes polyester fibres such as acetyl cellulose or polyglycol terephthalate from aqueous dispersion in red shades which have excellent fastness to sublimation.

7.1 parts of this dyestuff are suspended in 300 parts by volume of chlorobenzene. The suspension is heated to 110° and then 3.4 parts of diethyl sulphate are added whereupon the blue colour salt immediately begins to separate out. The reaction temperature is kept for another 30 minutes at 100–110°, the reaction mass is cooled to room temperature and then the cationic dyestuff is filtered off. To further purify, it is taken up in 500 parts by volume of warm water, the solution is clarified with a little animal charcoal and the dyestuff of the following formula

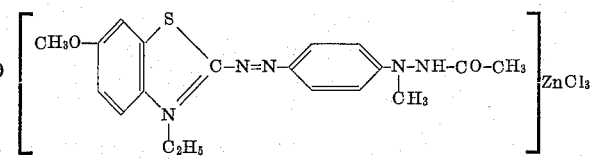

is precipitated with the aid of zinc chloride and sodium chloride.

It dissolves in water with a blue colour and dyes polyacrylonitrile fibres from an acetic acid bath, with substantial exhaustion thereof, in blue shades which have excellent fastness properties.

Colour salts having similar properties are obtained under the conditions given in the above example on using 19.4 parts of 2-amino-6-ethoxy-benzthiazole, 16.1 parts of 2-amino-6-chlorobenzthiazole, 16.4 parts of 2-amino-6-methylbenzthiazole, 15 parts of 2-amino-benzthiazole, 22.8 parts of 2-amino-6-methylsulphonyl-benzthiazole or 19.5 parts of 2-amino-6-nitro-benzthiazole, or if the alkylation is performed with 2.9 parts of dimethyl sulphate or 3.91 parts of benzyl bromide instead of with 3.4 parts of diethyl sulphate.

If the solution of 7.7 parts of the blue colour salt described in the first paragraph of this example is boiled for 1 hour in 200 parts by volume of 2 N hydrochloric acid then, after adding zinc chloride and potassium chloride to the cooled reaction mixture, the blue colour salt of the formula

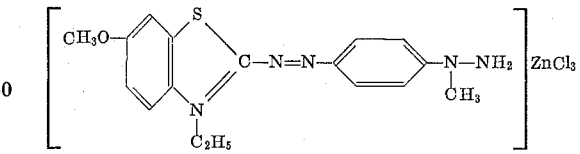

is obtained.

It dyes polyacrylonitrile fibres in blue shades which have good wet and light fastness properties.

*Example 9*

Polyacrylonitrile fibres are dyed with the water soluble azo dyestuffs produced according to the above examples as follows:

0.5 part of the dyestuff obtained according to Example 4 are pasted in 0.5 part of 80% acetic acid and dissolved by the addition of 4000 parts of hot water. One further part of 80% acetic acid, 2 parts of sodium acetate and 4 parts of a condensation product of olein alcohol and 15 mols of ethylene oxide are added and 100 parts of polyacrylonitrile fibres are entered. The bath is heated to 90° within 30 minutes, kept at this temperature for 10 minutes and then dyeing is performed at the boil for 1 hour. The dye bath is almost completely exhausted. The goods so treated are then soaped for 15 minutes at 80° in 5000 parts of water with the addition of a sulphonated fatty acid condensation product, rinsed and dried. The polyacrylonitrile fibre is dyed in pure blue shades which have excellent fastness to washing and light.

What is claimed is:
1. Dyestuff of the formula

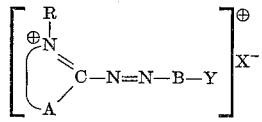

wherein

A is divalent radical selected from the group consisting of thiazolyl, lower alkyl-thiazolyl, phenylthiazolyl, hydroxyethyl-thiazolyl, lower alkoxythiazolyl, acetyl-thiazolyl, 1-lower alkyl-1,2,4-triazolyl, 1-lower alkyl-3-methyl-1,2,4-triazolyl, 3-carboxy-1-lower alkyl-1,2,4-triazolyl, 1,3,4-thiadiazolyl, 5-methyl-1,3,4-thiadiazolyl, pyridinyl, benzthiazolyl, lower alkylbenzthiazolyl, lower alkoxy-benzthiazolyl, chlorobenzthiazolyl, bromo-benzthiazolyl, nitro-benzthiazolyl, and 1-lower alkylindazolyl.

R is a member selected from the group consisting of lower alkyl and benzyl,

B is a penylene linked in a para position to said azo group and said Y group respectively, said phenylene being selected from the group consisting of unsubstituted phenylene and lower alkyl substituted phenylene, Y is a member selected from the group consisting of

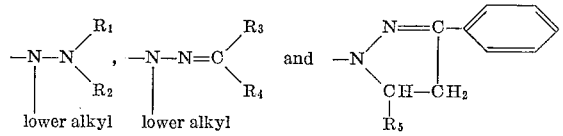

wherein $R_1$ is a member selected from the group consisting of H and lower alkyl, $R_2$ is a member selected from the group consisting of lower alkyl, cyclohexyl, benzyl, phenyl, lower alkyl-carbonyl, phenylacetyl, benzoyl and lower alkoxy-carbonyl.

$R_3$ and $R_4$ each is a member selected from the group consisting of —$CH_3$ and phenyl, $R_5$ is a member selected from the group consisting of H and phenyl, and X is an anion.

2. Dyestuff of the formula

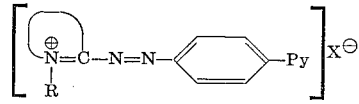

wherein the moiety

represents a divalent radical selected from the group consisting of benzothiazole, 6-methoxybenzothiazole, 6-ethoxybenzothiazole, 6-methylbenzothiazole, 6-chlorobenzothiazole, 1,2,4-triazole and thiazole, R represents a lower alkyl group,

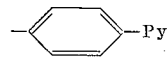

is 1-phenyl pyrazolinyl, Py being selected from the group consisting of unsubstituted pyrazolinyl, methyl-substituted pyrazolinyl and phenyl-substituted pyrazolinyl, and $X^-$ is an anion.

3. The dyestuff of the formula

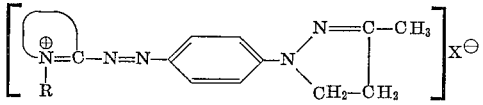

wherein the moiety

represents a divalent radical selected from the group consisting of benzothiazole, 6-methoxybenzothiazole, 6-ethoxybenzothiazole, 6-methylbenzothiazole, 6-chlorobenzothiazole, 1,2,4-triazole, and thiazole, R represents a lower alkyl group, and $X^-$ is an anion.

4. The dyestuff of the formula

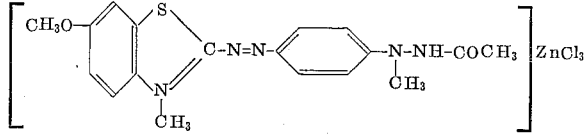

5. The dyestuff of the formula

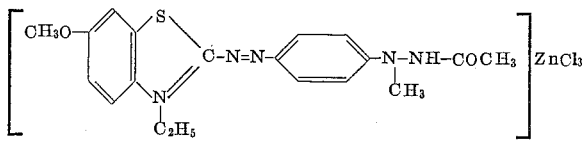

6. The dyestuff of the formula

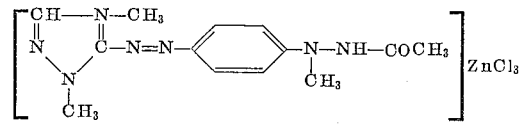

7. The dyestuff of the formula

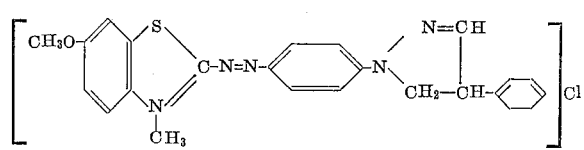

8. The dyestuff of the formula

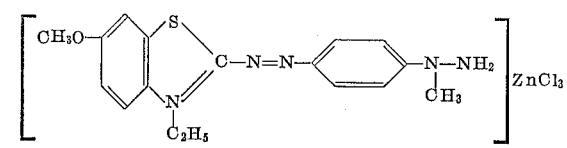

No references cited.

CHARLES B. PARKER, *Primary Examiner.*

L. ZITVER, *Examiner.*

REYNOLD J. FINNEGAN, *Assistant Examiner.*

UNITED STATES PATENT OFFICE
CERTIFICATE OF CORRECTION

Patent No. 3,280,100                            October 18, 1966

Jacques Voltz

It is hereby certified that error appears in the above numbered patent requiring correction and that the said Letters Patent should read as corrected below.

In the heading to the printed specification, line 3, for "Jacques Voltz, 15 Pilgerstrasse, Basel, Switzerland " read -- Jacques Voltz, Basel, Switzerland, assignor to J. R. Geigy A.-G., Basel, Switzerland --.

Signed and sealed this 12th day of September 1967.

(SEAL)
Attest:

ERNEST W. SWIDER                            EDWARD J. BRENNER
Attesting Officer                               Commissioner of Patents